United States Patent
Ferenz et al.

(10) Patent No.: US 12,252,588 B2
(45) Date of Patent: Mar. 18, 2025

(54) POLYETHER-SILOXANE BLOCK COPOLYMERS FOR THE PRODUCTION OF POLYURETHANE FOAMS

(71) Applicant: Evonik Operations GmbH, Essen (DE)

(72) Inventors: Michael Ferenz, Essen (DE); Michael Klostermann, Essen (DE); Kai-Oliver Feldmann, Essen (DE); Petra Schnell, Essen (DE); Michelle Eckhoff, Essen (DE)

(73) Assignee: Evonik Operations GmbH, Essen (DE)

( * ) Notice: Subject to any disclaimer, the term of this patent is extended or adjusted under 35 U.S.C. 154(b) by 695 days.

(21) Appl. No.: 17/523,059

(22) Filed: Nov. 10, 2021

(65) Prior Publication Data

US 2022/0185967 A1 Jun. 16, 2022

(30) Foreign Application Priority Data

Dec. 10, 2020 (EP) ...................... 20212983

(51) Int. Cl.
| | |
|---|---|
| *C08G 77/46* | (2006.01) |
| *C08G 77/08* | (2006.01) |
| *C08G 77/12* | (2006.01) |
| *C08G 101/00* | (2006.01) |
| *C08J 9/00* | (2006.01) |

(52) U.S. Cl.
CPC ............ *C08G 77/46* (2013.01); *C08G 77/08* (2013.01); *C08G 77/12* (2013.01); *C08J 9/0042* (2013.01); *C08J 9/0061* (2013.01); *C08G 2101/00* (2013.01); *C08J 2375/04* (2013.01)

(58) Field of Classification Search
CPC .... C08G 65/22; C08G 65/3322; C08G 77/46; C08G 77/08; C08G 77/12; C08G 77/445; C08G 2101/00; C08J 9/0042; C08J 9/0061; C08J 2375/04
See application file for complete search history.

(56) References Cited

U.S. PATENT DOCUMENTS

| | | | |
|---|---|---|---|
| 3,957,842 A | 5/1976 | Prokai et al. | |
| 4,150,048 A * | 4/1979 | Schilling, Jr. .......... | C08J 9/0061 |
| | | | 556/451 |
| 5,869,727 A | 2/1999 | Crane et al. | |
| 6,255,511 B1 | 7/2001 | Klein et al. | |
| 6,291,622 B1 | 9/2001 | Droese et al. | |
| 6,307,082 B1 | 10/2001 | Klein et al. | |
| 6,489,498 B2 | 12/2002 | Klein et al. | |
| 6,858,746 B2 | 2/2005 | Giessler et al. | |
| 7,598,334 B2 | 10/2009 | Ferez et al. | |
| 7,605,284 B2 | 10/2009 | Brueckner et al. | |
| 7,635,581 B2 | 12/2009 | Ferenz et al. | |
| 8,030,366 B2 | 10/2011 | Ferenz et al. | |
| 8,138,294 B2 | 3/2012 | Henning et al. | |
| 8,158,572 B2 | 4/2012 | Schubert et al. | |
| 8,198,473 B2 | 6/2012 | Ferenz et al. | |
| 8,344,089 B2 * | 1/2013 | Frey ..................... | C09D 183/14 |
| | | | 528/25 |
| 8,420,748 B2 | 4/2013 | Henning et al. | |
| 8,557,944 B2 | 10/2013 | Henning et al. | |
| 8,729,207 B2 | 5/2014 | Hartung et al. | |
| 8,802,744 B2 | 8/2014 | Knott et al. | |
| 8,883,932 B2 | 11/2014 | Brugger et al. | |
| 8,946,369 B2 | 2/2015 | Henning et al. | |
| 9,035,011 B2 | 5/2015 | Ferenz et al. | |
| 9,315,614 B2 | 4/2016 | Schubert et al. | |
| 9,328,210 B2 | 5/2016 | Terheiden et al. | |
| 9,334,354 B2 | 5/2016 | Ferenz et al. | |
| 9,353,225 B2 | 5/2016 | Knott et al. | |
| 9,540,500 B2 | 1/2017 | Ferenz et al. | |
| 9,657,144 B2 | 5/2017 | Hubel et al. | |
| 10,023,679 B2 | 7/2018 | Klostermann et al. | |
| 10,189,965 B2 | 1/2019 | Krebs et al. | |
| 10,351,687 B2 | 7/2019 | Diendorf et al. | |
| 10,787,464 B2 | 9/2020 | Fiedel et al. | |
| 10,995,174 B2 | 5/2021 | Emmrich-Smolczyk et al. | |
| 11,279,804 B2 | 3/2022 | Knott et al. | |
| 11,332,591 B2 | 5/2022 | Hermann et al. | |
| 2006/0155090 A1 | 7/2006 | Ferenz | |
| 2010/0036011 A1 | 2/2010 | De Gans et al. | |
| 2010/0056649 A1 * | 3/2010 | Henning ................ | C08G 77/12 |
| | | | 556/451 |

(Continued)

FOREIGN PATENT DOCUMENTS

| | | |
|---|---|---|
| DE | 40 03 621 C1 | 12/1990 |
| DE | 10 2004 034 740 A1 | 2/2006 |

(Continued)

OTHER PUBLICATIONS

Klostermann et al., U.S. Appl. No. 17/705,359, filed Mar. 27, 2022.
Lobert et al., U.S. Appl. No. 17/853,058, filed Jun. 29, 2022.
Reibold et al., U.S. Appl. No. 17/706,552, filed Mar. 28, 2022.
Suchan et al., U.S. Appl. No. 17/239,087, filed Apr. 23, 2021.
European Search Report mailed on Jun. 7, 2021 in EP 20212983.9 (6 pages).
Glos et al., U.S. Appl. No. 17/414,678, filed Jun. 16, 2021.
Glos et al., U.S. Appl. No. 17/414,726, filed Jun. 16, 2021.
Klostermann et al., U.S. Appl. No. 17/321,609, filed May 17, 2021.
Klostermann et al., U.S. Appl. No. 17/331,429, filed May 26, 2021.
Klostermann et al., U.S. Appl. No. 17/331,452, filed May 26, 2021.

(Continued)

*Primary Examiner* — Shane Fang
(74) *Attorney, Agent, or Firm* — Grüneberg and Myers PLLC

(57) ABSTRACT

A process for preparing polyether-siloxane block copolymers by hydrosilylation of alpha,omega-modified hydrosiloxanes with alpha,omega-modified di(meth)allyl polyethers in the presence of a hydrosilylation catalyst, wherein the reaction is performed in a solvent mixture comprising aromatic solvents, polyethers and alkoxylated alcohol, is described.

19 Claims, No Drawings

(56) References Cited

U.S. PATENT DOCUMENTS

| | | |
|---|---|---|
| 2011/0230619 A1 | 9/2011 | Kuppert et al. |
| 2013/0213267 A1 | 8/2013 | Fiedel et al. |
| 2013/0245304 A1* | 9/2013 | Schubert ............ C08G 64/0266 556/445 |
| 2013/0345318 A1 | 12/2013 | Schubert et al. |
| 2018/0016392 A1 | 1/2018 | Lobert et al. |
| 2018/0327563 A1 | 11/2018 | Klostermann et al. |
| 2019/0233646 A1 | 8/2019 | Inagaki et al. |
| 2019/0300728 A1 | 10/2019 | Klostermann et al. |
| 2020/0155436 A1 | 5/2020 | Hartung et al. |
| 2020/0207938 A1 | 7/2020 | Klostermann et al. |
| 2020/0377684 A1 | 12/2020 | Hermann et al. |
| 2021/0047474 A1 | 2/2021 | Klostermann et al. |
| 2021/0137276 A1 | 5/2021 | Landers et al. |
| 2021/0214488 A1 | 7/2021 | Emmrich-Smolczyk et al. |
| 2021/0238361 A1 | 8/2021 | Lobert et al. |
| 2021/0403493 A1 | 12/2021 | Klostermann et al. |
| 2021/0403673 A1 | 12/2021 | Klostermann et al. |
| 2021/0403676 A1 | 12/2021 | Klostermann et al. |
| 2021/0403678 A1 | 12/2021 | Klostermann et al. |
| 2022/0017679 A1 | 1/2022 | Glos et al. |
| 2022/0017680 A1 | 1/2022 | Modro et al. |
| 2022/0041829 A1 | 2/2022 | Glos et al. |
| 2022/0056231 A1 | 2/2022 | Wagner et al. |
| 2022/0243057 A1 | 8/2022 | Klostermann et al. |
| 2022/0243058 A1 | 8/2022 | Klostermann et al. |

FOREIGN PATENT DOCUMENTS

| | | |
|---|---|---|
| DE | 10 2013 216 787 A1 | 2/2015 |
| EP | 1 980 611 A2 | 10/2008 |
| EP | 3 173 205 | 5/2017 |
| EP | 3 536 735 A1 | 9/2019 |
| WO | 2013/156237 A1 | 10/2013 |
| WO | 2020/148170 | 7/2020 |
| WO | 2022/122360 A1 | 6/2022 |
| WO | 2022229311 A1 | 11/2022 |

OTHER PUBLICATIONS

Klostermann et al., U.S. Appl. No. 17/333,559, filed May 28, 2021.
Klostermann et al., U.S. Appl. No. 17/612,663, filed Nov. 19, 2021.
Klostermann et al., U.S. Appl. No. 17/612,690, filed Nov. 19, 2021.
Klostermann et al., U.S. Appl. No. 17/617,020, filed Dec. 7, 2021.
Klostermann et al., U.S. Appl. No. 17/617,127, filed Dec. 7, 2021.
Modro et al., U.S. Appl. No. 17/367,456, filed Jul. 5, 2021.
Wagner et al., U.S. Appl. No. 17/391,664, filed Aug. 2, 2021.

* cited by examiner

POLYETHER-SILOXANE BLOCK COPOLYMERS FOR THE PRODUCTION OF POLYURETHANE FOAMS

CROSS REFERENCE TO RELATED APPLICATIONS

This application is a 35 U.S.C. § 119 patent application which claims the benefit of European Application No. 20212983.9 filed Dec. 10, 2020, which is incorporated herein by reference in its entirety.

FIELD

The present invention is in the field of polyethersiloxanes, foams and polyurethane foams.

It relates more particularly to the preparation of specific polyether-siloxane block copolymers and to the use thereof for production of polyurethane foams, preferably of mechanically foamed polyurethane foams.

BACKGROUND

Mechanically foamed polyurethane foams are produced without using a physical or chemical blowing agent and are used in a wide variety of different coating processes. For example, they are used for backing foam of carpets and synthetic turf, for production of two-dimensional seals and what are called gap fillers, for example electronic components, what are called battery pads in lithium ion battery stacks, as footfall sound insulation for floor coverings, and in the field of adhesive coatings. The relevant foams are produced in typical fashion by mechanical foaming of a polyol-isocyanate mixture, in which air or nitrogen are forced into the polyol-isocyanate mixture with high shear input. The foam material thus produced can then be coated onto any desired substrate, for example a reverse side of a carpet or a release paper, and cured at elevated temperatures. Due to their production, mechanically foamed polyurethane foams are also referred to as beaten foams in specialist circles. The term "beaten foam" is also used for the present invention in exactly that manner.

For all applications mentioned above, it is important that a fine-cell foam is obtained if at all possible during the mechanical foaming. In addition, it is necessary that the foam has high stability so that defects in the foam can be avoided during the subsequent coating and drying procedure. For this reason it is customary to add foam stabilizers to the polyol-isocyanate mixture before or during the mechanical foaming, for which application polyether-siloxane block copolymers in particular have been found to be particularly efficient. In general, these stabilizers feature a linear $[AB]_n$ block structure of alternating polyether and siloxane chains. The higher the molecular weight of the compounds used as foam stabilizer, the higher the efficacy thereof. Non-hydrolysable $[AB]_n$ polyethersiloxanes are known to the person skilled in the art. For example, U.S. Pat. No. 3,957,842 describes such polymers. That patent describes the preparation of these structures by the hydrosilylation of diallyl polyethers with $\alpha,\omega$-SiH-functional siloxanes in toluene. The molecular weight of the resultant polymers is about 36,000-56,000 g/mol. U.S. Pat. No. 4,150, 048 describes non-hydrolysable $[AB]_n$ polyethersiloxanes that are prepared by hydrosilylation of polyethers having two $CH_2=C(R)CH_2$ end groups per molecule, where R is a monovalent hydrocarbon group. They are prepared with $\alpha,\omega$-SiH-functional siloxanes under hydrosilylation reaction conditions in the presence of a platinum catalyst. The linear block copolymers prepared are particularly useful as surfactants and foam stabilizers for the production of polyurethane foams. The low tendency to isomerization of the $CH_2=(R)CH_2-$ group to give non-reactive species during the hydrosilylation reaction leads to the unexpectedly high molecular weight of the copolymers.

U.S. Pat. No. 5,869,727 describes a vacuum process for preparing siloxane-oxyalkylene copolymers.

US 20190233646 describes a composition comprising $[AB]_n$ polyethersiloxanes. The composition comprises a polyether-polysiloxane block copolymer and a liquid organic monool compound which is either a glycol ether compound having a low degree of polymerization, a terminal hydrogen or an alcohol compound having a branched alkyl group having 12 or more carbon atoms.

As already described, a high molar mass is important and therefore particularly desirable for the provision of particularly effective foam stabilizers for mechanically foamed polyurethane foams. Too low a molar mass of the foam stabilizer would lead here to a reduced foam-stabilizing effect, which would give rise to coarse and irregular foams. Furthermore, the use of a low molecular weight foam stabilizer would limit the density range in which it would be possible to produce a mechanically foamed polyurethane foam, and the production of low-density (<400 g/l) foams would be a particular problem. As well as a maximum molecular weight of the foam stabilizer, however, it is also important that the molar mass distribution is as narrow as possible. In particular, tailing of the molar mass distribution toward very high molar masses can have an adverse effect. Such tailing can make the viscosity of the foam stabilizer very high, which greatly impairs the processibility thereof during foam production.

SUMMARY

The problem addressed by the present invention was therefore that of providing polyether-siloxane block copolymers that feature a particularly high molecular weight coupled with simultaneously very narrow molar mass distribution, associated with particularly efficient efficacy as a foam stabilizer.

It has been found that, surprisingly, the use of a particular solvent mixture enables the preparation of corresponding polyether-siloxane block copolymers and hence the solution of the stated problem.

DETAILED DESCRIPTION

The present invention therefore provides a process for preparing polyether-siloxane block copolymers of formula 1

Formula 1

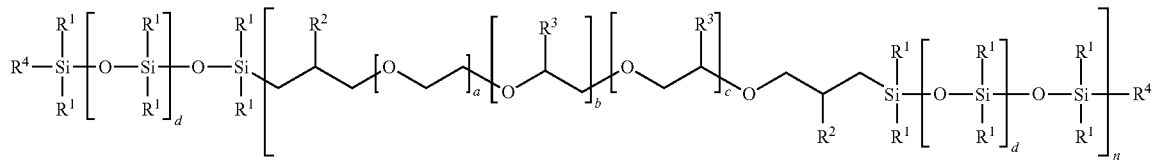

where
a=0 to 100, preferably 5 to 75, more preferably 10 to 50,
b=0 to 100, preferably 5 to 75, more preferably 5 to 25,
c=0 to 100, preferably 5 to 75, more preferably 5 to 25, a+b+c>3,
d=1 to 100, preferably 5 to 50, more preferably 7 to 30, most preferably 8-20,
n=5-200, preferably 10-100, more preferably 15-50, and
where the $R^1$ radicals are independently identical or different monovalent aliphatic or aromatic hydrocarbon radicals having 1 to 20 carbon atoms, preferably having 1 to 10 carbon atoms, most preferably methyl radicals,
and where the $R^2$ radicals are independently identical or different monovalent aliphatic, saturated or unsaturated hydrocarbon radicals having 1 to 20 carbon atoms or H, preference being given especially to methyl radicals,
and where the $R^3$ radicals are independently identical or different monovalent aliphatic or aromatic hydrocarbon radicals having 1 to 20 carbon atoms, preferably methyl radicals,
and where the $R^4$ radicals are independently selected from one of the $R^5$, $R^6$, $R^7$ radicals or H, where the $R^5$ radicals conform to the formula 2

Formula 2

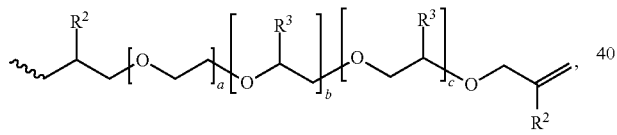

and where the $R^6$ radicals conform to the formula 3

Formula 3

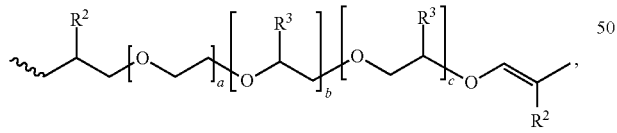

and where the $R^7$ radicals conform to the formula 4

Formula 4

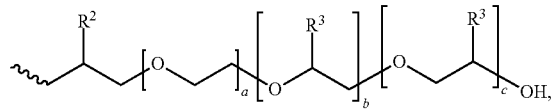

where the indices a, b and c and the $R^2$ and $R^3$ radicals are as defined above, by hydrosilylation of alpha,omega-modified hydrosiloxanes with alpha,omega-modified di(meth)allyl polyethers in the presence of a hydrosilylation catalyst capable of catalyzing the formation of an SiC bond by addition of an Si—H group onto a (meth)allylic double bond,
wherein the reaction is performed in a solvent mixture comprising aromatic solvents, preferably toluene and/ or alkylbenzene, and a polyether of the formula 5

Formula 5

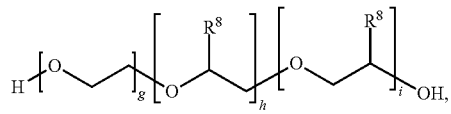

where
g=0 to 75, preferably 0 to 50, more preferably 0 to 25,
h=1 to 100, preferably 2 to 50, more preferably 3 to 25,
i=1 to 100, preferably 2 to 50, more preferably 3 to 25, and
where the $R^8$ radicals are independently identical or different monovalent aliphatic or aromatic hydrocarbon radicals having 1 to 20 carbon atoms, preferably methyl radicals,
and alkoxylated alcohol of the formula 6

Formula 6

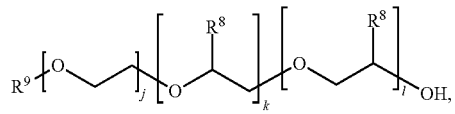

where
j=0 to 30, preferably 0 to 10, more preferably 0,
k=0 to 20, preferably 0 to 10, more preferably 0 to 5,
l=1 to 20, preferably 2 to 10, more preferably 3 to 5, and
where the $R^9$ radical is a monovalent aliphatic saturated or unsaturated, linear or branched hydrocarbyl radical having 6-40, preferably having 8-30, even more preferably having 10-22, carbon atoms,
and where the $R^8$ radicals are as defined above.

The sequence of the different oxyalkylene units that are specified between square brackets and with small-letter indices in the polyoxyalkylene radicals, polyols or alkoxylated alcohols may be random (statistically distributed), blockwise, gradually varying, or any mixture of these options in sections. The structural formulae specified here are merely a simplified graphical illustration in relation to the sequence.

The solvent mixture according to the invention thus comprises at least three components: aromatic solvent, polyether of the formula 5 and alkoxylated alcohol of the formula 6.

The advantages of the process according to the invention are not only that it enables the provision of corresponding polyether-siloxane block copolymers having high molecular weight and simultaneously very narrow molar mass distribution, but also that the resulting formulations, with a comparatively high active ingredient content, have a comparatively low viscosity, and hence have considerable processing advantages.

A further advantage is that the resulting polyether-siloxane block copolymers, with high molecular weight, have a narrow molar mass distribution. It is especially possible to assure the provision of polyether-siloxane block copolymers of formula 1 having a weight-average molar mass Mw (g/mol) of ≥60,000, advantageously >80,000, preferably >90,000, especially >100,000, where $M_w/M_n$<3.1, preferably <3.0, especially <2.9. $M_n$ is the number-average molar mass.

The high molar mass is advantageous in this context, particularly for the inventive use of the polyether-siloxane block copolymers described as foam stabilizer for producing polyurethane foams, especially beaten polyurethane foams, since this allows them to produce particularly fine-celled and stable foams. This also enables particularly efficient mechanical foaming of polyol-isocyanate mixtures, which is in turn associated with a number of processing advantages in the production of beaten polyurethane foams. The low viscosity and narrow molar mass distribution are likewise valuable from this point of view.

Overall, it can be stated that the polyether-siloxane block copolymers that are the result of the invention show excellent performance especially in the production of mechanically foamed PU foam. They assure optimal processability, while enabling the provision of PU foams of the highest quality.

Polyether-siloxane block copolymers are known per se. In the context of the entire present invention, the term "polyether" encompasses polyoxyalkylenes, preference being given particularly to polyoxyethylene and polyoxypropylene and also to polyoxyethylene-polyoxypropylene copolyethers. The distribution of various oxyalkylene units along the polymer backbone may be different. Mixed polyethers can be constructed, for example, statistically, in blocks or with different gradients of the monomer units to each other. Statistical construction in this context signifies that the polyoxyethylene and polyoxypropylene units are distributed in a random sequence across the polyether chain, whereas a blockwise constructed polyether consists of defined polyoxyethylene and polyoxypropylene blocks.

In the context of the entire present invention, the term siloxane includes compounds from the class of polyorganosiloxanes, the class of polydimethylsiloxanes being especially preferred. In the context of the entire present invention, the term polyether-siloxane block copolymers includes polymers which are constructed from alternating polyether and siloxane blocks.

The polyether-siloxane block copolymers of the invention are subject to the formula 1.

The term polyurethane foam is known per se to those skilled in the art (see, for example, Adam et al., "Polyurethanes", Ullmann's Encyclopedia of Industrial Chemistry—Paragraph 7", 2012, Wiley VCH-Verlag, Weinheim). In the context of the entire present invention, the term beaten polyurethane foam includes polyurethane foams which are produced by mechanical beating of air, nitrogen, $CO_2$ or other inert gases into a polyol-isocyanate mixture, with use of only small amounts of additional physical or chemical blowing agent, preferably none at all. It is synonymous with the term "mechanically foamed polyurethane foam".

The preparation of the polyether-siloxane block copolymers according to the invention is based on the hydrosilylation reaction which is known to the person skilled in the art, and can be effected by such a reaction of alpha,omega-modified hydrosiloxanes with alpha,omega-modified di(meth)allyl polyethers. The chemical reactions forming the basis of this preparation are known in the technical literature and are described extensively therein (see, for example, Silicones—Chemistry and Technology, Vulkan-Verlag Essen, 1989).

The invention is described further and by way of example hereinafter, without any intention that the invention be restricted to these illustrative embodiments. Where ranges, formulae, or classes of compound are stated below, these are intended to encompass not only the corresponding ranges or groups of compounds mentioned explicitly, but also all subranges and subgroups of compounds that can be obtained by extracting individual values (ranges) or compounds. Where documents are cited in the context of the present description, the entire content thereof, particularly with regard to the subject matter that forms the context in which the document has been cited, is intended to form part of the disclosure content of the present invention. Unless otherwise stated, percentages are in percent by weight. Molar percentages are identified in abbreviated form by m %. Where parameters that have been determined by measurement are given hereinbelow, the measurements have been carried out at a temperature of 25° C. and a pressure of 101 325 Pa, unless otherwise stated. Where chemical (empirical) formulae are used in the present invention, the specified indices can be not only absolute numbers but also average values. For polymeric compounds, the indices preferably represent average values. Structural and empirical formulae presented in the present invention are representative of all isomers that are possible by differing arrangement of the repeating units. Where, in the context of the present invention, compounds such as polyethers, siloxanes or polyether siloxanes, for example, that can have different units multiple times are described, these can occur in statistical distribution (statistical oligomer or polymer), in ordered form (block oligomer or block polymer) or as gradient distribution in these compounds.

The solvent mixture according to the invention comprises, as well as aromatic solvent, polyether of the formula 5 and alkoxylated alcohol of the formula 6. It corresponds to a preferred embodiment of the present invention when the polyether of the formula 5 and the alkoxylated alcohol of the formula 6 are used in a mass ratio of 1:4 to 4:1, preferably in a mass ratio of 1:3 to 3:1.

It is further preferable when the aromatic solvent, based on the entire solvent mixture used, preferably comprising toluene and/or alkylbenzene, is used in amounts of >15% by weight, preferably >20% by weight, especially >30% by weight. This too corresponds to a preferred embodiment of the present invention.

The reactants used are alpha,omega-modified hydrosiloxanes and alpha,omega-modified di(meth)allyl polyethers, and are used in the presence of a hydrosilylation catalyst. When the sum total of the masses of polyether of the formula 5 and of the alkoxylated alcohol of the formula 6 to the sum total of the masses of the reactants is in a ratio of 7:3 to 1:4, this is a further preferred embodiment of the invention.

The alpha,omega-modified di(meth)allyl polyether is preferably used in such a concentration that the molar ratio of polyether-bound double bonds to Si—H groups is in the range from 0.95:1.05 to 1.05:0.95, preferably in the range from 0.97:1.03 to 1.03:0.97, more preferably in the range from 0.99:1.01 to 1.01:0.99. This too corresponds to a preferred embodiment of the invention.

The hydrosilylation according to the invention is effected in the presence of a hydrosilylation catalyst. When the hydrosilylation catalyst used for the reaction is selected from the group of the platinum catalysts, especially the platinum (0) catalysts, with very particular preference especially for platinum(0) catalysts in the form of the Karstedt catalyst, this is a further preferred embodiment of the invention.

Such catalysts are known; see, for example, Lewis et al., "Platinum Catalysts used in Silicones Industry", Platinum Metal Review, 1997, 44(23), 66-74.

It is optionally possible to remove the aromatic solvent from the mixture after the hydrosilylation, for example by distillation, especially when the aromatic solvent is toluene. This corresponds to a further preferred embodiment of the process according to the invention.

The polyethersiloxanes prepared by the process according to the invention preferably have a weight-average molar mass Mw of at least 60,000 g/mol, preferably of at least 70,000 g/mol, more preferably of at least 80,000 g/mol, and a number average molar mass Mn of at least 25,000 g/mol, preferably of at least 27,500 g/mol, more preferably of at least 30,000 g/mol. It is further preferable when the ratio of Mw/Mn is less than 3.1, preferably less than 3.0, more preferably less than 2.9. The terms "weight-average molar mass Mw" and "number-average molar mass Mn" are known to the person skilled in the art. These two parameters can preferably be determined by gel permeation chromatography (GPC), preferably calibrated against polystyrene. For this purpose, for example, it is possible to use the SECcurity2 GPC system from PCC, calibrated against polystyrene. In particular, it is possible to use the SECcurity 1260 GPC system from PCC, preferably with the following experimental framework parameters: SDV 1000/10000 Å column combination, PSS SECurity 1260 RI detector, THF mobile phase, flow rate 1 ml/min), calibrated against polystyrene (162-2 520,000 g/mol).

The mixtures obtained from the process according to the invention can be used in accordance with the invention for production of polyurethane foams, especially beaten polyurethane foams.

The present invention thus further provides a formulation suitable as additive for the production of polyurethane foams, preferably beaten PU foam, comprising the following components:

(a) polyether-siloxane block copolymers of formula 1

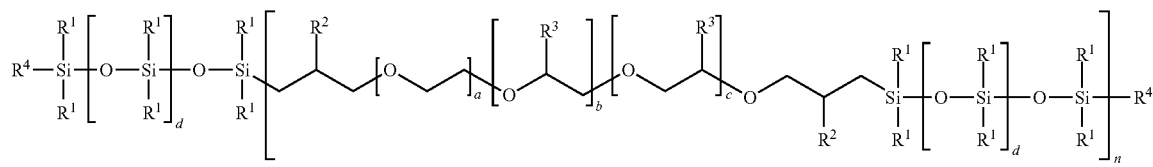

Formula 1 where
a=0 to 100, preferably 5 to 75, more preferably 10 to 50,
b=0 to 100, preferably 5 to 75, more preferably 5 to 25,
c=0 to 100, preferably 5 to 75, more preferably 5 to 25,
d=1 to 100, preferably 5 to 50, more preferably 7 to 30, most preferably 8-20,
n=5-200, preferably 10-100, more preferably 15-50, and
wherein the radicals $R^1$ are each independently identical or different monovalent aliphatic or aromatic hydrocarbon radicals having 1 to 20 carbon atoms, preferably having 1 to 10 carbon atoms, especially preferably methyl radicals, and where the $R^2$ radicals are independently identical or different monovalent aliphatic, saturated or unsaturated hydrocarbon radicals having 1 to 20 carbon atoms or H, preference being given especially to methyl radicals, and where the $R^3$ radicals are independently identical or different monovalent aliphatic or aromatic hydrocarbon radicals having 1 to 20 carbon atoms, preferably methyl radicals, and where the $R^4$ radicals are independently selected from one of the $R^5$, $R^6$, $R^7$ radicals or H, where the $R^5$ radicals conform to the formula 2

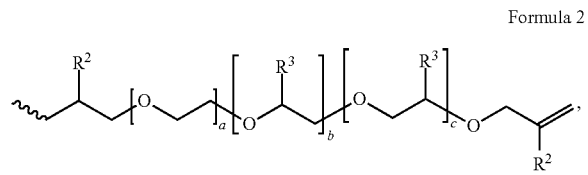

Formula 2 and where the $R^6$ radicals conform to the formula 3

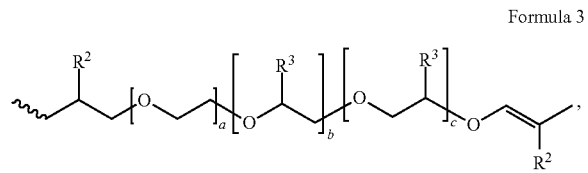

Formula 3 and where the $R^7$ radicals conform to the formula 4

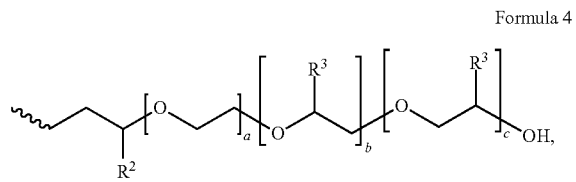

Formula 4 where the indices a, b and c and the $R^2$ and $R^3$ radicals are as defined above, (b) polyethers of the formula 5

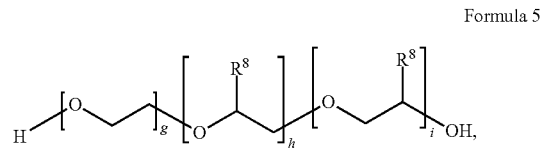

Formula 5 where
g=0 to 75, preferably 0 to 50, more preferably 0 to 25,
h=1 to 100, preferably 2 to 50, more preferably 3 to 25,
i=1 to 100, preferably 2 to 50, more preferably 3 to 25, and
where the $R^8$ radicals are independently identical or different monovalent aliphatic or aromatic hydrocarbon radicals having 1 to 20 carbon atoms, preferably methyl radicals,
(c) alkoxylated alcohol of the formula 6

Formula 6

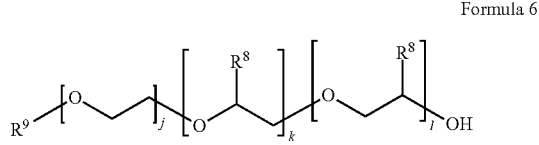

where
j=0 to 30, preferably 0 to 10, more preferably 0 to 5,
k=1 to 20, preferably 2 to 10, more preferably 3 to 5,
l=1 to 20, preferably 2 to 10, more preferably 3 to 5, and
where the $R^9$ radical is a monovalent aliphatic saturated or unsaturated, linear or branched hydrocarbon radical having 6-40, preferably having 8-30, even more preferably having 10-22, carbon atoms, and where the $R^8$ radicals are independently identical or different monovalent aliphatic or aromatic hydrocarbon radicals having 1 to 20 carbon atoms, preferably methyl radicals,
(d) optionally aromatic solvents. In a preferred embodiment, the formulation contains essentially no aromatic solvents, i.e. less than 5% by weight of aromatic solvents or less than 1% by weight of aromatic solvents, or else no aromatic solvents at all.

In a preferred embodiment of the invention, components b) and c) are present in the formulation in a mass ratio of 1:4 to 4:1, preferably in a mass ratio of 1:3 to 3:1.

In addition, preference is given to formulations in which the sum total of the masses of b) and c) to a) is in a ratio of 8:2 to 1:4. This corresponds to a preferred embodiment of the invention.

In addition, preference is given to formulations in which the polyether-siloxane block copolymer of the formula 1 is present in a concentration of at least 20% by weight, preferably of at least 25% by weight, more preferably of at least 30% by weight, based on the overall formulation.

The present invention enables, as already stated, the provision of polyether-siloxane block copolymers having high molecular weights coupled with narrow molar mass distribution.

A formulation according to the invention comprising polyether-siloxane block copolymers of formula 1 having a Mv, (g/mol) of >60,000, preferably >70,000, especially >80,000, where $M_w/M_n$<3.1, preferably <3.0, especially <2.9, corresponds to a particularly preferred embodiment of the invention. As already described further up, within the scope of this invention, Mv, and Mn can preferably be determined by gel permeation chromatography (GPC), preferably calibrated against polystyrene.

In addition, it may be preferable when the formulation according to the invention also comprises a pendent stabilizer as an additional component. Pendent stabilizers here are likewise polyethersiloxanes, but one that have a silicone chain bearing pendent and/or terminal polyether chains. The polyether chains here may be bonded to the silicone chain either via a silicon-carbon bond (Si—C) or a silicon-oxygen-carbon bond (Si—O—C), particular preference being given to silicon-carbon bonds. Preference is given here especially to those pendent Si—C-based polyethersiloxanes that conform to the formula 7

Formula 7

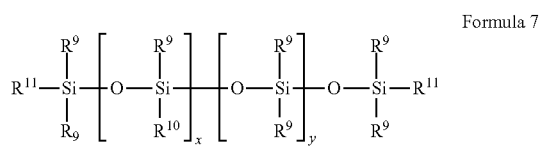

where
x=0 to 50, preferably 1 to 25, more preferably 2 to 15,
y=0 to 250, preferably 5 to 150, more preferably 5 to 100,
where the $R^9$ radicals are independently identical or different monovalent aliphatic or aromatic hydrocarbon radicals having 1 to 20 carbon atoms, preferably having 1 to 10 carbon atoms, and are most preferably methyl radicals, and where the $R^m$ radicals are independently identical or different OH-functional or -terminated, preferably methyl- or acetyl-terminated, polyoxyalkylene radicals, preferably polyoxyethylenepolyoxypropylene radicals, and where the $R^{11}$ radicals correspond either to $R^9$ or $R^{10}$.

The formulations according to the invention are obtainable by the process according to the invention as described above, and optional subsequent removal of the aromatic solvent, especially when the latter is toluene. Additional components such as, in particular, a pendent stabilizer of formula 7 may be added as well.

Since, as described above, the polyether-siloxane block copolymers according to the invention are efficient stabilizers for the production of polyurethane foams, especially beaten polyurethane foams, the present invention likewise provides for the use of the formulations according to the invention as additives, especially as foam-stabilizing additive, for production of polyurethane foams, preferably beaten PU foams, especially in combination with pendent stabilizer of formula 7.

When the polyurethane foam to be produced is a mechanically foamed polyurethane foam containing less than 2% by weight, preferably less than 1% by weight, more preferably less than 0.5% by weight, most preferably less than 0.1% by weight of a chemical or physical blowing agent, this is a particularly preferred embodiment of the invention.

This invention thus also further provides a polyurethane foam, preferably beaten PU foam, produced using a formulation according to the invention as described above. The term "polyurethane foam" in the context of this invention refers to foams which are formed by reacting polyisocyanates with compounds reactive towards them, preferably having OH groups ("polyols") and/or NH groups (Adam et al., "Polyurethanes", Ullmann's Encyclopedia of Industrial Chemistry", 2012, Wiley VCH-Verlag, Weinheim). Polyols for producing corresponding foams are known per se. Particularly suitable polyols within the context of this invention are any organic substances having a plurality of isocyanate-reactive groups, and also preparations of said substances. Preferred polyols are any polyether polyols and polyester polyols usually used for the production of polyurethane foams. Polyether polyols are obtainable by reacting polyhydric alcohols or amines with alkylene oxides. Polyester polyols are based on esters of polybasic carboxylic acids (usually phthalic acid, adipic acid or terephthalic acid) with polyhydric alcohols (usually glycols). Additionally preferred polyols are short-chain diols, for example ethylene glycol, propylene glycol, diethylene glycol or dipropylene glycol, which can be used as chain extenders for example.

Isocyanates for producing polyurethane foams are likewise known per se. The isocyanate component preferably includes one or more organic isocyanates having two or more isocyanate functions. Examples of suitable isocyanates within the context of this invention are any polyfunctional organic isocyanates, for example diphenylmethane 4,4'-diisocyanate (MDI), toluene diisocyanate (TDI), hexamethylene diisocyanate (HMDI) and isophorone diisocyanate (IPDI). Also particularly suitable are isocyanate-based prepolymers, especially MDI-based prepolymers.

Within the scope of the present invention, the ratio of isocyanate to polyol, expressed as the NCO index, is preferably in the range from 40 to 500, more preferably 60 to 350, especially preferably 80-120. The NCO index here describes the ratio of isocyanate actually used to calculated isocyanate (for a stoichiometric reaction with polyol). An NCO index of 100 represents a molar ratio of reactive groups of 1:1.

In addition to the polyether-siloxane block copolymers according to the invention, the polyurethanes may also comprise further additives and auxiliaries such as, for example, fillers, blowing agents, catalysts, organic and inorganic pigments, stabilizers such as, for example, hydrolysis or UV stabilizers, antioxidants, absorbers, crosslinkers, dyes, emulsifiers or dispersant additives, levelling aids or thickeners/rheology additives.

In the context of the present invention, particularly suitable catalysts for producing polyurethane foams, especially beaten polyurethane foams, are gel catalysts which catalyze the polyurethane reaction between isocyanate and polyol. These may be selected from the class of amine catalysts, for example triethylamine, dimethylcyclohexylamine, tetramethylethylenediamine, tetramethylhexanediamine, pentamethyldiethylenetriamine, pentamethyldipropylenetriamine, triethylenediamine, dimethylpiperazine, 1,2-dimethylimidazole, N-ethylmorpholine, tris(dimethylaminopropyl)hexahydro-1,3,5-triazine, dimethylaminoethanol, dimethylaminoethoxyethanol, tetramethylguanidine, and 1,8-diazabicyclo[5.4.0]undec-7-ene. Furthermore, amine catalysts can be selected from the class of so-called emission-free amine catalysts which are characterized in that they have a catalytically active nitrogen atom and a group reactive towards NCO groups such as, for example, an OH group. Appropriate emission-free amine catalysts are marketed, for example under the product series Dabco® NE from Evonik. In addition, the catalysts can be selected from the class of metal catalysts, for example tin, zinc, bismuth, iron, copper, nickel, or zirconium-based catalysts. Metal catalysts may be present here in the form of salts or of organic derivatives. The catalysts mentioned above can be used either in pure form or as catalyst mixtures. In the case of beaten polyurethane foams, particularly suitable are thermolatent catalysts, i.e. catalysts which only develop efficacy over and above a certain activation temperature and therefore enable delayed curing of the foams.

In the context of the present invention, the polyurethane foams are preferably beaten polyurethane foams which are produced by mechanically beating the polyol-isocyanate mixture.

Such beaten foams preferably contain less than 2% by weight, more preferably less than 1% by weight, especially preferably less than 0.5% by weight, most preferably less than 0.1% by weight of a chemical or physical blowing agent. The polyurethane foams especially preferably comprise no physical or chemical blowing agent at all.

As already described, the use of the formulations comprising polyether-siloxane block copolymers according to the invention for producing beaten polyurethane foams is a particularly preferred subject of the present invention. Preferably, such beaten polyurethane foams can be produced by a process comprising the steps of a) providing a polyol component, an isocyanate component, a formulation comprising polyether-siloxane block copolymers according to the invention, and optionally further additives, b) mixing all components to give a homogeneous mixture, c) mechanically foaming the mixture while introducing a gas, for example air or nitrogen, to give a homogeneous fine-cell foam, d) applying the foamed reaction mixture to a substrate, e) curing the foamed reaction mixture.

It is made clear that the process steps of this process as set out above are not subject to any fixed sequence in time. For instance, process step b) and c) can be carried out simultaneously, meaning that individual components are added to and mixed with the reaction mixture only during the foaming procedure. Individual additives, such as the catalyst for example, can also be added only after process step c) for the mechanically foamed reaction mixture.

It corresponds to a preferred embodiment of the present invention when, in process step c), the reaction mixture of polyol, isocyanate and optionally further additives is foamed by the application of high shear forces. The foaming can be effected here with the aid of shear units familiar to the person skilled in the art, for example Dispermats, dissolvers, Hansa mixers or Oakes mixers.

It is additionally preferable if the mechanically foamed reaction mixture after process step c) has a density in the range of 50-1000 g/l, preferably in the range of 75-600 g/l, more preferably in the range of 100-450 g/l.

In process step d), the reaction mixture can be applied to virtually any desired substrate, for example carpet backings, the backings of synthetic turf, adhesive coatings, textile carrier webs, release liners or release films, and also to metals, either to be left on the metal permanently or for later removal of the cured reaction mixture.

It is additionally preferable when, in process step e), the foamed reaction mixture is cured at elevated temperatures. Preference is given here in accordance with the invention to curing temperatures of at least 50° C., preferably of 60° C., more preferably of at least 70° C.

The invention further provides for the use of a polyurethane foam according to the invention, preferably beaten PU foam, as described above, for production of floor coverings such as carpets, footfall sound insulation or synthetic turf, and for production of textile coatings or of seal materials, gap fillers, shock pads or compression pads.

As already described above, the polyethersiloxanes obtainable by the process according to the invention are notable for a particularly advantageous molar mass and for a particularly advantageous molar mass distribution, which means that they are particularly suitable for use as additive for the production of polyurethane foams, preferably beaten PU foam. The present invention therefore further provides polyether-siloxane block copolymers conforming to the formula 1

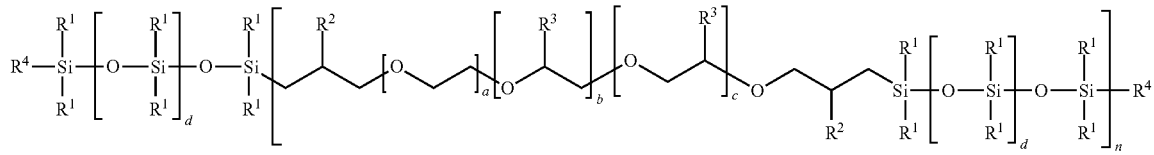

Formula 1 where
a=0 to 100, preferably 5 to 75, more preferably 10 to 50,
b=0 to 100, preferably 5 to 75, more preferably 5 to 25,
c=0 to 100, preferably 5 to 75, more preferably 5 to 25, a+b+c>3,
d=1 to 100, preferably 5 to 50, more preferably 7 to 30, most preferably 8-20,
n=5-200, preferably 10-100, more preferably 15-50, and
where the $R^1$ radicals are independently identical or different monovalent aliphatic or aromatic hydrocarbon radicals having 1 to 20 carbon atoms, preferably having 1 to 10 carbon atoms, most preferably methyl radicals,
and where the $R^2$ radicals are independently identical or different monovalent aliphatic, saturated or unsaturated hydrocarbon radicals having 1 to 20 carbon atoms or H, preference being given especially to methyl radicals,
and where the $R^3$ radicals are independently identical or different monovalent aliphatic or aromatic hydrocarbon radicals having 1 to 20 carbon atoms, preferably methyl radicals,
and where the $R^4$ radicals are independently selected from one of the $R^5$, $R^6$, $R^7$ radicals or H,
where the $R^5$ radicals conform to the formula 2

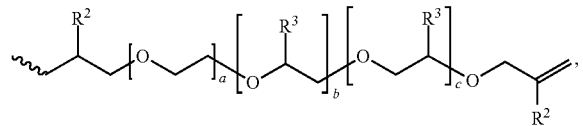

Formula 2 and where the $R^6$ radicals conform to the formula 3

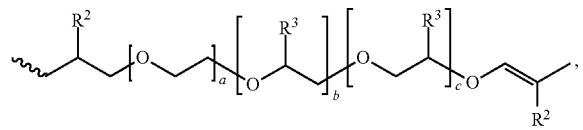

Formula 3 and where the $R^7$ radicals conform to the formula 4

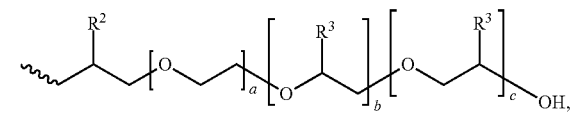

Formula 4 where the indices a, b and c and the $R^2$ and $R^3$ radicals are as defined above, and having a weight-average molar mass Mw of at least 60,000 g/mol, preferably of at least 70,000 g/mol, more preferably of at least 80,000 g/mol, and a number-average molar mass Mn of at least 25,000 g/mol, preferably of at least 27,500 g/mol, more preferably of at least 30,000 g/mol, it being especially preferable when the ratio of Mw/Mn is less than 3.1, preferably less than 3.0, more preferably less than 2.9. These polyether-siloxane block copolymers can preferably be prepared by the process according to the invention as described in detail above.

The present invention still further provides for the use of these polyether-siloxane block copolymers according to the invention as additives for the production of polyurethane foams, preferably beaten PU foams, especially in combination with at least one additional polyethersiloxane-based stabilizer having a siloxane chain bearing pendent and/or terminal polyether chains, where the polyether chains may be bonded to the silicone chain via either a silicon-carbon bond (Si—C) or a silicon-oxygen-carbon bond (Si—O—C), particular preference being given to silicon-carbon bonds, and preference being given especially to those pendent Si—C-based polyethersiloxanes that conform to the formula 7, as already defined above, in which context reference is made in full to the preceding description.

EXAMPLES

Measurement of OH number:

All OH number measurements were conducted by the method that follows. For this purpose, the substance to be analysed is first acetylated with a defined amount of acetic anhydride. The excess amount of acetic anhydride is then hydrolysed with water, and the amount of acetic acid released is ascertained by titration against phenolphthalein with 0.5 n potassium hydroxide solution in ethanol. In addition, a blind run is conducted by the same method, but without the substance to be analysed. The OH number of the sample is then calculated by the following formula:

$$OH-\text{Number} = \frac{(b-a) \cdot 28.05}{E}$$

a=ml of 0.5 N aqueous potassium hydroxide solution consumed in the main run
b=ml of 0.5 N aqueous potassium hydroxide solution consumed in the blank run
E=starting weight in g Materials:

a) SiH siloxane A

In the syntheses that follow, a siloxane of the general formula a was used.

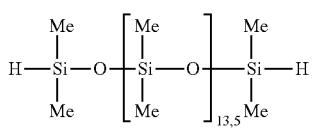

Formula a: SiH siloxane A.

As usual in siloxane polymers, linear siloxane chains also contain a certain proportion of cyclic siloxanes, for example octamethylcyclotetrasiloxane. The SiH siloxane used in the experiments contains, for example, 4.2 m % octamethylcyclotetrasiloxane and 2.8 m % decamethylcyclopentasiloxane.

b) Bismethallyl polyether A

In the syntheses that follow, a polyether of the general formula b was used.

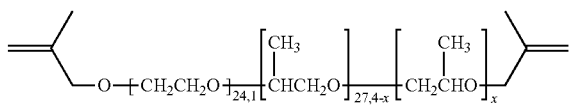

Formula b: Bismethallyl polyether A.

The bismethallyl polyether A was prepared by prior art methods by reaction from the corresponding polyether diol with methallyl chloride. The residual OH number was <1 mg KOH/100 g.

c) Polyether of the formula 5

In the synthesis, the polyether of the formula 5 used was a polyether diol Lupranol® 1200 (CAS number 25322-69-4). Lupranol® 1200 is a difunctional polyetherol from BASF Polyurethanes GmbH with a hydroxyl number of about 250 mg KOH/g determined to DIN 53240.

d) Alkoxylated alcohol of the formula 6

In the synthesis, the alkoxylated alcohol of the formula 6 used was Varonic® APM T. Varonic® APM T is a PPG-3 Myristyl Ether from Evonik. The general formula of Varonic® APM T is shown in formula c.

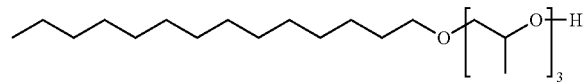

Formula c: Structural formula of Varonic® APM T.

e) Karstedt catalyst solution

The catalyst used was a solution of the Karstedt catalyst (1,3-divinyl-1,1,3,3-tetramethyldisiloxaneplatinum(0)) in decamethylcyclopentasiloxane. The platinum content w(Pt) was 0.6%.

SYNTHESIS EXAMPLES

Example 1: Synthesis in Toluene

A 500 ml three-neck flask with precision glass stirrer and reflux condenser was initially charged with 73 g of the bismethallyl polyether A. Subsequently, 103 g of toluene and 30 g of the SiH siloxane A were added. The reaction mixture was heated to 80° C. Then 10 ppm of Pt was added in the form of the Karstedt catalyst solution. The reaction mixture was heated to 95° C. and stirred at that temperature for 3 hours. The result was a product in gel form that was diluted with a further 103 g of toluene in the meantime in order to keep it stirrable. A clear product in gel form was obtained. On account of the very high viscosity, it was not possible to remove the solvent by distillation.

Example 2: Synthesis in Toluene/Polypropylene Glycol

A 1000 ml three-neck flask with precision glass stirrer and reflux condenser was initially charged with 73 g of the bismethallyl polyether A. Subsequently, 103 g of toluene, 103 g of Lupranol® 1200 and 30 g of the SiH siloxane A were added. The reaction mixture was heated to 80° C. Then 10 ppm of Pt was added in the form of the Karstedt catalyst solution. The reaction mixture was heated to 95° C. and stirred at that temperature for 3 hours. Subsequently, the volatile constituents were removed under reduced pressure at 130° C. and 1 mbar.

An extremely cloudy product was obtained.

Example 3: Synthesis in Toluene/Alkoxylated Alcohol

A 1000 ml three-neck flask with precision glass stirrer and reflux condenser was initially charged with 73 g of the bismethallyl polyether A. Subsequently, 103 g of toluene, 103 g of Varonic® APM T and 30 g of the SiH siloxane A were added. The reaction mixture was heated to 80° C. Then 10 ppm of Pt was added in the form of the Karstedt catalyst solution. The reaction mixture was heated to 95° C. and stirred at that temperature for 3 hours. Subsequently, the volatile constituents were removed under reduced pressure at 130° C. and 1 mbar.

An extremely cloudy product was obtained.

Example 4: Synthesis in Toluene/Polypropylene Glycol/Alkoxylated Alcohol

A 1000 ml three-neck flask with precision glass stirrer and reflux condenser was initially charged with 73 g of the bismethallyl polyether A. Subsequently, 103 g of toluene, 77 g of Lupranol® 1200, 26 g of Varonic® APM T and 30 g of the SiH siloxane A were added. The reaction mixture was heated to 80° C. Then 10 ppm of Pt was added in the form of the Karstedt catalyst solution. The reaction mixture was heated to 95° C. and stirred at that temperature for 3 hours. Subsequently, the volatile constituents were removed under reduced pressure at 130° C. and 1 mbar.

A clear product was obtained.

Example 5: Synthesis in Toluene/Polypropylene Glycol/Alkoxylated Alcohol

A 1000 ml three-neck flask with precision glass stirrer and reflux condenser was initially charged with 73 g of the bismethallyl polyether A. Subsequently, 103 g of toluene, 26 g of Lupranol® 1200, 77 g of Varonic® APM T and 30 g of the SiH siloxane A were added. The reaction mixture was heated to 80° C. Then 10 ppm of Pt was added in the form of the Karstedt catalyst solution. The reaction mixture was heated to 95° C. and stirred at that temperature for 3 hours. Subsequently, the volatile constituents were removed under reduced pressure at 130° C. and 1 mbar.

A clear product was obtained.

Example 6: Synthesis in Toluene/Polypropylene Glycol/Alkoxylated Alcohol

A 1000 ml three-neck flask with precision glass stirrer and reflux condenser was initially charged with 146 g of the bismethallyl polyether A. Subsequently, 206 g of toluene, 103 g of Lupranol® 1200, 103 g of Varonic® APM T and 60 g of the SiH siloxane A were added. The reaction mixture was heated to 80° C. Then 10 ppm of Pt was added in the form of the Karstedt catalyst solution. The reaction mixture was heated to 95° C. and stirred at that temperature for 3 hours. Subsequently, the volatile constituents were removed under reduced pressure at 130° C. and 1 mbar.

A clear product was obtained.

For all experiments, the molar masses of the polyethersiloxanes obtained were determined by means of gel permeation chromatography (GPC). For this purpose, the SECcurity2 GPC system from PCC, calibrated against polystyrene, was used. The average molar mass Mw and Mn obtained from these measurements are listed in Table 1. The viscosities of all samples were also measured. For this purpose, a Brookfield LV Brookfield viscometer equipped with a #64 spindle was used. All measurements in which viscosities exceeding 100,000 mPas were measured were conducted at 2.5 rpm. All measurements in which viscosities below 100,000 mPas were measured were conducted at 10 rpm. The values thus obtained are likewise listed in Table 1.

TABLE 2

Overview of formulation used in foaming experiments.

| Polyol | Manufacturer/supplier | Composition | Parts by weight |
|---|---|---|---|
| Voranol ® CP 3322 | Dow | EO/PO polyether polyol OHN = 48 mg KOH/g; f ≈ 3 | 140 |
| Voralux ® HN 360 | Dow | SAN polymer polyether polyol OHN = 30 mg KOH/g, f ≈ 3 | 60 |
| DPG | Sigma Aldrich | Dipropylene glycol OHN = 836 mg KOH/g, f = 2 | 30 |
| KOSMOS ® N 200 | Evonik | Nickel(II) acetylacetonate Catalyst | 4 |
| Stabilizer | | From Example 1-6 | 4 |
| Omya ® BLS | Omya GmbH | CaCO$_3$ filler | 230 |
| Suprasec ® 6505 | Huntsman | Polymeric MDI NCO % = 29.3% | 92 Index = 105 |

TABLE 1

Overview of experiments.

| Example | w (SiH siloxane + bismethallyl polyether)/% | w (toluene)/% | w (Lupranol 1200)/% | w (Varonic ® APM T)/% | Mw/ (g/mol) | Mw/Mn | Viscosity/ (mPas) | Appearance |
|---|---|---|---|---|---|---|---|---|
| 1 | 50.00 | 50.00 | 0.0 | 0.0 | 164254 | 3.71 | gel-like | Gel |
| 2 | 33.34 | 33.33 | 33.33 | 0.0 | 128219 | 3.47 | 96000 | very cloudy |
| 3 | 33.34 | 33.33 | 0.0 | 33.33 | 100461 | 3.11 | 60300 | slightly cloudy |
| 4 | 33.34 | 33.33 | 24.92 | 8.41 | 119853 | 3.06 | 189600 | Clear |
| 5 | 33.34 | 33.33 | 8.41 | 24.92 | 118783 | 2.97 | 102400 | Clear |
| 6 | 33.34 | 33.33 | 16.66 | 16.67 | 104606 | 2.84 | 41050 | Clear |

It was found that there is a distinct decrease in the breadth of the molar mass distribution when the reaction is conducted in the presence of a solvent consisting of toluene, the polyether Lupranol® 1200 and the alkoxylated alcohol Varonic® APM T. The products obtained were also clear. The breadth of the molar mass distribution can be read off here from the Mw/Mn ratio.

The greater this is, the broader the molar mass distribution; in the case of the noninventive samples described here (Examples 1-3), at a high Mw/Mn value, tailing of the molar mass distribution toward very high molar masses was observable.

If the polyether diol or the alkoxylated alcohol is left out, the result is cloudy products, and the polyethersiloxanes obtained have a broader molar mass distribution. If toluene is used as the sole solvent, clear products are obtained, but these have an even broader molar mass distribution. As a result of this, the products obtained were gel-like and no longer free-flowing.

Cloudy products are also undesirable since there can be separations according to the length of storage. Inhomogeneous products complicate production processes.

Polyurethane formulation:

To assess the efficacy of the polyether-siloxane block copolymers prepared in Examples 1-6 as stabilizer for the production of beaten polyurethane foams, a series of test foamings was conducted. These were done using the polyurethane formulation described in Table 2:

Example 7: Machine Foaming Operations

Machine foaming operations were conducted using a fully automatic laboratory foam generator, Pico Mix XL type from Hansa-Mixer, equipped with 2 separate eccentric spiral hopper pumps. For this purpose, firstly a premixture (batch size about 5 kg) of polyols, stabilizer, catalyst and calcium carbonate was prepared and then filled into one of the two hopper pumps of the foam generator. The other hopper pump was filled with the isocyanate component. The formulation described in Table 1 was used here. For the foaming experiments, polyol premixture and isocyanate were simultaneously injected into the mixing head of the foam generator and foamed therein by simultaneous introduction of air. The mixing head was operated here at 850 rpm in all experiments. The delivery rates of both hopper pumps were constantly adjusted such that polyol and isocyanate were injected into the mixing head in the appropriate ratio (corresponding to the NCO index of the formulation), with a total mass flow of 9 kg/h. The air flow into the mixing head was selected so as to obtain foam densities of 250 and 300 g/l after foaming. The homogeneity and stability of the foam obtained on discharge from the mixing head was an evaluation criterion for the efficacy of the foam stabilizer. The foamed reaction mixture was then painted (layer thickness 6 mm) onto a coated release paper using a laboratory coating table/dryer, Labcoater LTE-S from Mathis AG, and cured at 120° C. for 15 minutes. Cell structure and cell homogeneity of the cured foam were a further evaluation criterion for the effectiveness of the foam stabilizer.

TABLE 3

Results of machine foaming operations

| | 250 g/l | 300 g/l |
|---|---|---|
| Polyethersiloxane in toluene (Example 1) | | |
| Foam stability | — — | o |
| Foam homogeneity | -- | — |
| Polyethersiloxane in toluene/polypropylene glycol (Example 2) | | |
| Foam stability | -- | — |
| Foam homogeneity | -- | — |
| Polyethersiloxane in toluene/alkoxylated alcohol (Example 3) | | |
| Foam stability | — | o |
| Foam homogeneity | o | o |
| Polyethersiloxane in toluene/polypropylene glycol/alkoxylated alcohol (Example 4) | | |
| Foam stability | o | + |
| Foam homogeneity | + | + |
| Polyethersiloxane in toluene/polypropylene glycol/alkoxylated alcohol (Example 5) | | |
| Foam stability | + | ++ |
| Foam homogeneity | + | ++ |
| Polyethersiloxane in toluene/polypropylene glycol/alkoxylated alcohol (Example 6) | | |
| Foam stability | ++ | ++ |
| Foam homogeneity | ++ | ++ |

(rating from - - = very poor, through o = average to ++ = very good)

As apparent from the composition in Table 2, foams comprising polyether-siloxane block copolymers according to the invention that have been produced by the process according to the invention have improved foam stability and a finer and more homogeneous cell structure. By contrast, the noninventive stabilizers from Examples 1-3 gave quite coarse and irregular foams having reduced stability, which was manifested, for example, by coarser cells as the foams cured.

The foaming results thus clearly demonstrate the improved efficacy of the foam stabilizers produced by the process according to the invention.

The invention claimed is:

1. A process for preparing polyether-siloxane block copolymers of formula 1

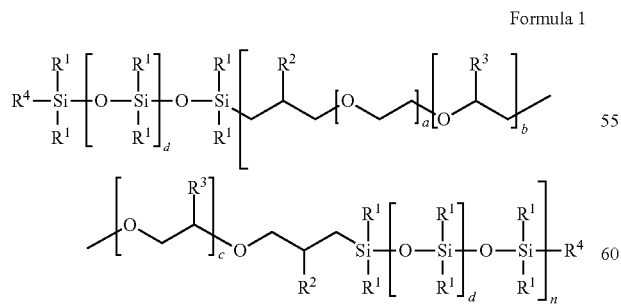

Formula 1 where
a=0 to 100,
b=0 to 100,
c=0 to 100,
a+b+c>3,
d=1 to 100,
n=5-200, and
where the $R^1$ radicals are independently identical or different monovalent aliphatic or aromatic hydrocarbon radicals having 1 to 20 carbon atoms,
and where the $R^2$ radicals are independently identical or different monovalent aliphatic, saturated or unsaturated hydrocarbon radicals having 1 to 20 carbon atoms or H,
and where the $R^3$ radicals are independently identical or different monovalent aliphatic or aromatic hydrocarbon radicals having 1 to 20 carbon atoms,
and where the $R^4$ radicals are independently selected from one of the $R^5$, $R^6$, $R^7$ radicals or H, where the $R^5$ radicals conform to the formula 2

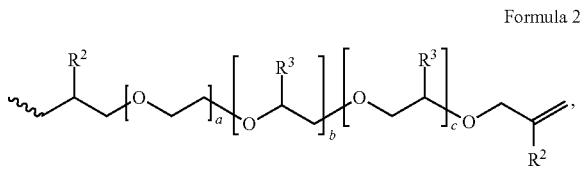

Formula 2 and where the $R^6$ radicals conform to the formula 3

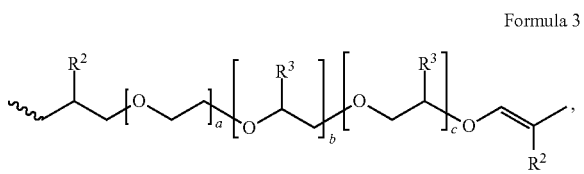

Formula 3 and where the $R^7$ radicals conform to the formula 4

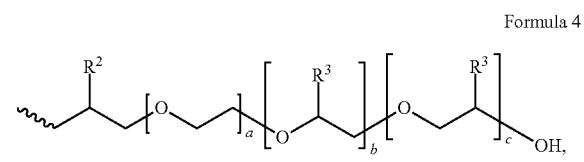

Formula 4 where the indices a, b and c and the $R^2$ and $R^3$ radicals are as defined above,
by hydrosilylation of alpha, omega-modified hydrosiloxanes with alpha, omega-modified di(meth)allyl polyethers in the presence of a hydrosilylation catalyst capable of catalyzing the formation of an SiC bond by addition of an Si—H group onto a (meth)allylic double bond,
wherein the reaction is performed in a solvent mixture comprising toluene and/or alkylbenzene, a polyether of the formula 5

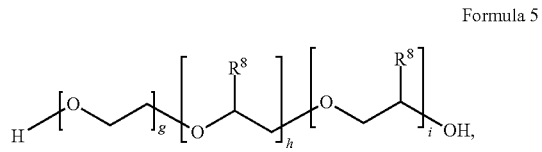

Formula 5 where
g=0 to 75,
h=1 to 100,
i=1 to 100, and
where the $R^8$ radicals are independently identical or different monovalent aliphatic or aromatic hydrocarbon radicals having 1 to 20 carbon atoms, and alkoxylated alcohol of the formula 6

Formula 6

$$R^9\!\!-\!\!\left[O\!\!-\!\!\right]_j\!\!\left[O\!\!-\!\!\overset{R^8}{\underset{}{\text{CH}}}\!\!-\!\!\right]_k\!\!\left[O\!\!-\!\!\overset{R^8}{\underset{}{\text{CH}}}\!\!\right]_l\!\!OH$$

where
j=0 to 30,
k=0 to 20,
l=1 to 20, and
where the $R^9$ radical is a monovalent aliphatic saturated or unsaturated, linear or branched hydrocarbyl radical having 6-40, carbon atoms,
and where the $R^8$ radicals are as defined above.

2. The process according to claim 1, wherein the polyether of the formula 5 and the alkoxylated alcohol of the formula 6 are used in a mass ratio of 1:4 to 4:1.

3. The process according to claim 1, wherein the aromatic solvent, based on the entire solvent mixture used, comprising toluene and/or alkylbenzene, is used in amounts of >15% by weight.

4. The process according to claim 1, wherein the sum total of the masses of polyether of the formula 5 and of the alkoxylated alcohol of the formula 6 is in a ratio of 8:2 to 1:4 to the sum total of the masses of the reactants.

5. The process according to claim 1, wherein the alpha, omega-modified di(meth)allyl polyether is used in such a concentration that the molar ratio of polyether-bound double bonds to siloxane-bound Si—H groups is in the range from 0.95:1.05 to 1.05:0.95.

6. The process according to claim 1, wherein the hydrosilylation catalyst used for the reaction is selected from the group consisting of platinum catalysts, platinum (0) catalysts, and platinum (0) catalysts in the form of the Karstedt catalyst.

7. The formulation suitable as additive for the production of polyurethane foams, comprising the following components:
(a) polyether-siloxane block copolymers of formula 1 where
a=0 to 100,
b=0 to 100,
c=0 to 100,
d=1 to 100,
n=5-200, and
where the $R^1$ radicals are independently identical or different monovalent aliphatic or aromatic hydrocarbon radicals having 1 to 20 carbon atoms,
and where the $R^2$ radicals are independently identical or different monovalent aliphatic, saturated or unsaturated hydrocarbon radicals having 1 to 20 carbon atoms or H,
and where the $R^3$ radicals are independently identical or different monovalent aliphatic or aromatic hydrocarbon radicals having 1 to 20 carbon atoms,
and where the $R^4$ radicals are independently selected from one of the $R^5$, $R^6$, $R^7$ radicals or H, where the $R^5$ radicals conform to the formula 2

Formula 2 and where the $R^6$ radicals conform to the formula 3

Formula 3 and where the $R^7$ radicals conform to the formula 4

Formula 4

Formula 1 where the indices a, b and c and the $R^2$ and $R^3$ radicals are as defined above,
(b) polyethers of the formula 5

Formula 5

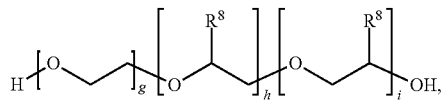

where
g=0 to 75,
h=1 to 100,
i=1 to 100, and
where the $R^8$ radicals are independently identical or different monovalent aliphatic or aromatic hydrocarbon radicals having 1 to 20 carbon atoms,
(c) alkoxylated alcohol of the formula 6

Formula 6

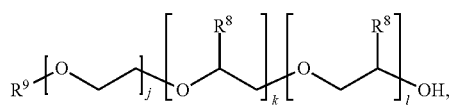

where
j=0 to 30,
k=1 to 20,
l=1 to 20, and
where the $R^9$ radical is a monovalent aliphatic saturated or unsaturated, linear or branched hydrocarbyl radical having 6-40,
and where the $R^8$ radicals are as defined above, and
(d) optionally aromatic solvents.

8. The formulation according to claim 7, wherein components b) and c) are present in a mass ratio of 1:4 to 4:1.

9. The formulation according to claim 7, wherein the sum total of the masses of b) and c) to a) is in a ratio of 8:2 to 1:4.

10. The formulation according to any of claim 7, wherein polyether-siloxane block copolymers of formula 1 have a $M_w$ (g/mol) of≥60,000, where $M_w/M_n$<3.1.

11. The formulation according to claim 7, wherein the additional component used is at least one pendent polyethersiloxane-based stabilizer having a siloxane chain bearing pendent and/or terminal polyether chains, where the polyether chains may be bonded to the silicone chain via either a silicon-carbon bond (Si—C) or a silicon-oxygen-carbon bond (Si—O—C), or a pendent Si—C-based polyethersiloxanes that conform to the formula 7

Formula 7

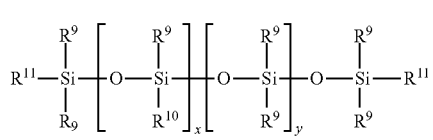

where
x=0 to 50,
y=0 to 250, where the $R^9$ radicals are independently identical or different monovalent aliphatic or aromatic hydrocarbon radicals having 1 to 20 carbon atoms, and where the $R^{10}$ radicals are independently identical or different OH-functional or -terminated, and where the $R^{11}$ radicals correspond either to $R^9$ or $R^{10}$.

12. The formulation according to a process according to claim 1 and subsequent removal of the toluene.

13. A polyurethane foam comprising the formulations according to claim 7, in combination with at least one additional polyethersiloxane-based stabilizer having a siloxane chain bearing pendent and/or terminal polyether chains, where the polyether chains may be bonded to the silicone chain via either a silicon-carbon bond (Si—C) or a silicon-oxygen-carbon bond (Si—O—C).

14. The polyurethane foam according to claim 13, wherein the polyurethane foam to be produced is a mechanically foamed polyurethane foam containing less than 2% by weight, of a chemical or physical blowing agent.

15. The polyurethane foam, produced using a formulation according to claim 7.

16. The polyurethane foam according to claim 15 for production of floor coverings such as carpets, footfall sound insulation or synthetic turf, and for production of textile coatings or of seal materials, gap fillers, shock pads or compression pads.

17. The process according to claim 1, wherein
where
a=10 to 50,
b=5 to 25,
c=5 to 25,
a+b+c >3,
d=8 to 20, and
n=15-50, and
where the $R^1$ radicals are methyl radicals,
and where the $R^2$ radicals are methyl radicals,
and where the $R^3$ radicals are methyl radicals,
wherein the reaction is performed in a toluene solvent mixture,
a polyether of the formula 5

Formula 5

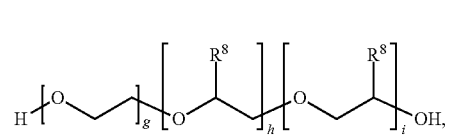

where
g=0 to 25,
h=3 to 25,
i=3 to 25, and
where the $R^8$ radicals are methyl radicals,
and alkoxylated alcohol of the formula 6

Formula 6

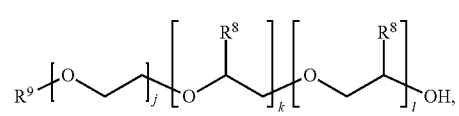

where
j=0,
k=0,
l=3 to 5, and
where the $R^9$ radical is a monovalent aliphatic saturated or unsaturated, linear or branched hydrocarbyl radical having 10-22 carbon atoms,
and where the $R^8$ radicals are as defined above.

18. The process according to claim 1, wherein the polyether of the formula 5 and the alkoxylated alcohol of the formula 6 are used in a mass ratio of 1:3 to 3:1.

19. The process according to claim 1, wherein the aromatic solvent, based on the entire solvent mixture used, comprising toluene and/or alkylbenzene, is used in amounts of >30% by weight.

* * * * *